(12) United States Patent
Tincombe

(10) Patent No.: US 10,201,169 B1
(45) Date of Patent: *Feb. 12, 2019

(54) FORMULA FOR A FOOD DECORATING PAINT FOR APPLICATION ON THE SURFACE OF FOOD OBJECTS

(71) Applicant: Michelle D. Tincombe, Phoenix, AZ (US)

(72) Inventor: Michelle D. Tincombe, Phoenix, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 15/601,516

(22) Filed: May 22, 2017

Related U.S. Application Data

(63) Continuation-in-part of application No. 14/695,234, filed on Apr. 24, 2015.

(60) Provisional application No. 61/983,575, filed on Apr. 24, 2014.

(51) Int. Cl.
| | |
|---|---|
| *A23L 5/42* | (2016.01) |
| *A23G 3/34* | (2006.01) |
| *A23L 5/44* | (2016.01) |
| *A23L 29/00* | (2016.01) |
| *A23L 29/10* | (2016.01) |

(52) U.S. Cl.
CPC ............ *A23G 3/343* (2013.01); *A23L 5/44* (2016.08); *A23L 29/015* (2016.08); *A23L 29/03* (2016.08); *A23L 29/10* (2016.08); *A23L 5/42* (2016.08); *A23V 2002/00* (2013.01)

(58) Field of Classification Search
CPC ........ A23D 7/001; A23D 7/003; A23D 7/013; A23G 1/305; A23G 3/343; A23G 3/346; A23G 3/36; A23G 3/362
See application file for complete search history.

(56) References Cited

U.S. PATENT DOCUMENTS

| | | | |
|---|---|---|---|
| 4,645,674 A * | 2/1987 | Lang | A21D 13/28 426/302 |
| 5,102,680 A | 4/1992 | Glass et al. | |
| 6,203,841 B1 | 3/2001 | Lynch et al. | |
| 2006/0013928 A1* | 1/2006 | Steet | A23G 1/30 426/302 |
| 2011/0280942 A1* | 11/2011 | Schad | A61K 9/2813 424/476 |

FOREIGN PATENT DOCUMENTS

WO    WO2013061061    5/2013

* cited by examiner

*Primary Examiner* — Walter A Moore
(74) *Attorney, Agent, or Firm* — Mark V. Loen

(57) ABSTRACT

The embodied invention is a ready to mix instant formula that is used for application on a food surface for the purpose of decoration. The mixture is a complete 'ready to mix' and pleasant tasting paint mixture which saves the consumer time and effort from having to mix their own decorative art medium to their individual specifications. It also allows the consumer to apply colors on top of each other without color bleed. The formulation includes FDA approved food colors, emulsifiers, and a pH additive. It also allows the decorator ease in combining colors to custom specifications. The ease of application is designed for all settings of food decoration, both for professional and household use. The formulation is also unique by using a white pigment suspension to provide a full spectrum of ready to use, vibrant colors.

2 Claims, No Drawings

FORMULA FOR A FOOD DECORATING PAINT FOR APPLICATION ON THE SURFACE OF FOOD OBJECTS

CROSS REFERENCE TO RELATED APPLICATIONS

This application is a continuation in part of U.S. application Ser. No. 14/695,234 filed on Apr. 24, 2015 which claims the benefit of provisional application No. 61/983,575 filed on Apr. 24, 2014. Both prior applications are incorporated by reference herein.

STATEMENT REGARDING FEDERALLY SPONSORED RESEARCH OR DEVELOPMENT

Not applicable.

REFERENCE TO SEQUENCE LISTING, A TABLE, OR COMPUTER PROGRAM LISTING

Not applicable.

BACKGROUND OF THE INVENTION

(1) Field of the Invention

This invention is directed toward convenient food decorating mixtures, specifically mixtures which are directly applied to the surface of a food object, such as cookies, cakes, confections, pastries, chocolates, and other food items without the need to mix into another medium.

(2) Description of Related Art

There are instant food art mediums currently on the market, specifically for food, which are used as craft medium by the consumer for the purpose of food art. Such craft mediums are applied to food products such as icing, frosting, fondant, cookie dough or other food surfaces. For example, current instant food coloring mixtures do not have a smooth finish that can be overlapped without a bleeding effect when they are applied to surfaces. Also, they do not allow a desirable opaque finish or a pleasant taste which consumers would expect on a finished food product. Other instant mixture craft mediums have similar difficulties. The creation of precise and visibly pleasing colors is difficult as the colors bleed extensively into each other when applying currently available mixtures on top of each other. Therefore, the consumer is unable to apply specific colors or designs properly. For example, if the consumer wanted to paint a pink heart with a yellow design over the top of it, the two colors bleed into each other due to the thin viscosity of the colorants, changing both colors into an undesirable and muddled effect. Furthermore, since these other powders are not created specifically to be overlapped, they create difficulties for the artist when applying them on surfaces as a decorative food paint. Also, they are highly concentrated with food dye products. The other instant powders have a very unpleasant, bitter taste which is not practical for direct food surface application, especially for the decoration of food products such as cookies, cakes, cupcakes, pastries, desserts, etc.

Most, if not all, currently available decorative mixtures are lacking in some aspect. Some current mixtures do not paint smoothly or evenly to achieve a professional finish to the artwork. Others are not opaque in use. Many lack a pleasing taste. Other mixtures cannot be overlapped without bleeding into one another.

Some existing products for decorating such as Luster Dust, Disco Dust, Twinkle Dust, Sparkle Dust, Highlighter, Shimmer Powder, Pearl Dust, and Petal Dust are not considered edible food as they are not on the approved FDA list of edible or digestible foods. These non-approved FDA materials are used anyway to obtain some visual effect. The FDA advises home and commercial bakers to avoid use of these non-edible food items. It is important that any decorative material meets the FDA guidelines.

As examples of this mis-application, US 20120328742 discusses the use of Luster Dust in a decorative toothpick mold, US 20120207884 discusses adding Disco Dust to an edible glue, US 20160120767 discusses adding sparkle dust to Confectionary Resembling Jewels, and CN 105555314 discusses adding Shimmer Powder to cosmetics, such as lip balm.

Some products are difficult to clean off art utensils and leave difficult to remove specs of colorant behind after use.

The current method of decorating requires the decorator to use instant powder as an ingredient by mixing it into water, alcohol, the icing, frosting, whipped cream, etc. etc. and self-determine when the decorating mixture is suitable to the decorating project that they are working on. Additionally, it must provide the desired taste (i.e. not be bitter) and capable of providing the desired aesthetic effect. This is a difficult requirement as it requires the decorator to experiment with the base material and adjust the amount of liquid needed to achieve the multiple desired requirements. The desired colors must not bleed into each other, mix well (i.e. disperse), have appropriate taste, be non-toxic, have the proper consistency, and have the color that facilitates the desired artistic effect. It is difficult for the decorator to achieve a desirable taste and an aesthetic appeal by using a broad spectrum of colors when decorating. Experimentation by the decorator leads to waste and lack of optimizing the taste and desired decorative effects. An unskilled decorator lacks the skill, knowledge, and time to provide a mixture suitable to meet all demands.

Others have worked in the field of instant decorative products, which have colors that bleed into each other, have a metallic taste, have a gritty mouth feel, they are not opaque, and do not cover food surfaces well.

What is needed in the market is a dry premade instant decorating mix that is neither bitter tasting (due to the dyes/colorants used), and allows for extensive decorating without color bleed. For example, the mixture must allow the decorator to paint multiple overlays of colors to achieve the desired aesthetic effects without one color melting or bleeding extensively into another color, be capable of a full spectrum of colors without the need for color mix experimentation by the decorator. Further, it is very inconvenient for a decorator to experiment by mixing food colorants into a base to achieve the desired colors which are currently not available in the market and the mixture must also have a viscosity which allows the artist to apply the paints using various application techniques, such as paint brushes, sponging, rolling, stamping, pallet knife texturing etc.

BRIEF SUMMARY OF THE INVENTION

The embodied invention is a dry, ready to mix instant powder mixture that is used for application on a food surface for the purpose of decoration, much like an artist applies paint to a canvas in various techniques and textures. It is not an ingredient, a food 'colorant', or metallic embellishment. The mixture is a complete 'ready to mix', desirable tasting paint mixture which allows the consumer/artist to overlap colors without color bleed. The dry mixture is normally added to water or other edible liquid by a decorator for use in decorating, but could also be applied as a powder. This formula also saves the decorator time by providing an easy method of painting colors on the surface of food such as icing and fondant instead of the effort and messiness of mixing different ingredients and flavorings together for a desired artistic effect. It can be applied in various techniques such as brushes, sponges, and rollers in a paint like viscosity, or applied using an impasto technique utilizing pallet knives. The formulation includes a base formula, FDA approved food dyes or Lakes, optional emulsifiers, and a pH additive. It also allows the decorator ease in combining colors without color bleed to desired specifications. It also allows the artist convenience in decorating with ready to mix and use instant food paint in vibrant colors. The ease of application is designed for all settings of food decoration, both for professional and household use. The formulation is also unique by using a white pigment suspension to provide a full spectrum of ready to use, vibrant colors. A decorator also has the option of easily combining colors to their own custom specifications.

This mixture is easily washed from art utensils because it is formulated to easily disperse in water. The embodied invention provides easy cleanup without visible specs of material remaining on any utensil.

BRIEF DESCRIPTION OF THE SEVERAL VIEWS OF THE DRAWING(S)

Not applicable.

DETAILED DESCRIPTION OF THE INVENTION

The recipe for the invention is a combination of
1) Base application mixture
2) Colorant(s)
3) Emulsifier(s)
and
4) pH additive(s).

The base mixture is a combination of sugar, salt (NaCl), vegetable gum, pH additive, white colorant, and vanilla (or other) flavoring.

The colorant mixture is comprised of food grade or combinations of FDA approved FD&C colorants or Aluminum Lake Pigments, dye mixes, mixtures of food colorants including additives exempt from FDA certification, and additives requiring FDA certification which are added to the base mixture. In particular, it has been found that adding a colorant of $TiO_2$ and/or calcium carbonate provides a basis to achieve a broad spectrum of vibrant colors. The mixture is designed to allow the $TiO_2$ to disperse well.

Dyes and lakes are used in food coloring. Generally, dyes dissolve in water but not in oil. They are used in all kinds of food, such as liquid, mixes, and finished products. Dyes can cause problems with ingestion if the amount is too high. Lakes are made from dyes which are chemically combined with a salt. Lakes tint by dispersion and are more stable than dyes and generally dissolve better in oil.

A list of color additives exempt from certification by the FDA and permanently listed for FOOD use follows. The numbers in brackets ( ) indicate a regulation number under 21CFR.

A. Algae meal, dried—Chicken feed only: ≤0.3% ethoxyquin in meal≤150 ppm ethoxyquin in final feed—(73.275)
B. Annatto extract—GMP—(73.30)
C. Astaxanthin—Salmonid fish feed only: ≤80 mg per kg of finished feed—(73.35)
D. Astaxanthin dimethyl disuccinate—Salmonid fish feed only: ≤80 mg per kg of finished feed—(73.37)
E. Beet juice (as vegetable juice)—GMP—(73.260)
F. Beet powder (Dehydrated beets)—GMP—(73.40)
G. Beta-Apo-8'-carotenal—General use: ≤15 mg/lb. of solid or semisolid food or per pint of liquid food—(73.90)
H. Beta carotene, natural and synthetic—GMP—(73.95)
I. Canthaxanthin—General use: ≤30 mg/lb. of solid or semisolid food or per pint of liquid food; broiler chicken feed: ≤4.41 mg per kg (4 gm/ton) of complete feed; salmonid fish feed: ≤80 mg per kg (72 gm/ton) of finished feed—(73.75)
J. Caramel—GMP—(73.85)
K. Carmine—GMP—(73.100)
L. Carrot oil—GMP—(73.300)
M. Cochineal extract—GMP—(73.100)
N. Corn endosperm oil—Chicken feed only—(73.315)
O. Cottonseed flour, toasted partially defatted cooked—GMP—(73.140)
P. Ferrous gluconate—Ripe olives only—GMP—(73.160)
Q. Ferrous lactate—Ripe olives only—GMP—(73.165)
R. Fruit juice—GMP—(73.250)
S. Grape color extract—Nonbeverage food only—(73.169)
T. Grape skin extract (enocianina)—Still and carbonated drinks and ades, beverage bases and alcoholic beverages (in accordance with Parts 4 & 5 of 27 CFR)—(73.170)
U. Haematococcus algae meal—Salmonid fish feed only. Total astaxanthin from all astaxanthin color additive sources listed in part 73, ≤80 mg per kg of finished feed—(73.185)
V. Synthetic iron oxide—Sausage casings for humans: ≤0.10% by wt. of finished food; cat & dog food: ≤0.25% by wt. of finished food—(73.200)
W. Lycopene, tomato extract or concentrate—GMP—(73.585)
X. Mica-based pearlescent pigment—1.25% by weight in cereals, confections and frostings, gelatin desserts, hard and soft candies (including lozenges), nutritional supplement tablets and gelatin capsules, and chewing gum.—(73.350)
Y. Paprika & Paprika oleoresin—GMP—(73.340 & 73.345)
Z. *Paracoccus* pigment—Salmonid fish feed only: ≤80 mg per kg of finished feed—(73.352)
AA. Phaffia yeast—Salmonid fish feed only. Total astaxanthin from all astaxanthin color additive sources listed in part 73, ≤80 mg per kg of finished feed—(73.355)
BB. Riboflavin—GMP—(73.450)
CC. Saffron—GMP—(73.500)
DD. Sodium copper chlorophyllin—Citrus-based dry beverage mixes only: ≤0.2 percent by wt. of the dry mix—(73.125)

EE. *Tagetes* (Aztec marigold) meal and extract—Chicken feed only: ethoxyquin content≤0.3% by wt. of additive and ≤150 ppm by wt. of final feed—(73.295)
FF. Titanium dioxide—≤1.0% by wt. of food—(73.575)
GG. Turmeric & Turmeric oleoresin—GMP—(73.600 & 73.615)
HH. Ultramarine blue—Salt for animal feed only: ≤0.5% by wt. of salt—(73.50
II. Vegetable juice—GMP—(73.260)
FD&C Colorants used in Food
A. FD&C Blue #1—Food, drugs, and cosmetics, including drugs and cosmetics for eye area—GMP—(74.101, 74.1101, 74.2101, 82.101)
B. FD&C Blue #2—Food and ingested drugs—GMP—(74.102, 74.1102); sutures—see medical devices—(74.3102.)
C. FD&C Green #3—Food, drugs, and cosmetics—GMP—(74.203, 74.1203, 74.2203, 82.203)
D. FD&C Red #3—Food and ingested drugs—GMP—(74.303, 74.1303). May no longer be used in cosmetics, external drugs, and lakes
E. FD&C Red #40 and its Aluminum Lake—Food, drugs, and cosmetics, including drugs and cosmetics for eye area—GMP. Other lakes for food, drugs and cosmetics are also permanently listed—(74.340, 74.1340, 74.2340)
F. FD&C Yellow #5—Food, drugs, and cosmetics, including drugs and cosmetics for eye area—GMP—(74.705, 74.1705, 74.2705, 82.705)
G. FD&C Yellow #6—Food, drugs, and cosmetics—GMP—(74.706, 74.1706, 74.2706, 82.706)

In one embodiment the emulsifier is a vegetable gum such as Cellulose Gum, Gum Arabic, Guar Gum, Xanthan Gum. Additionally, it could Lecithin.

In another embodiment, the pH additive is a Citric Acid, but other pH additives could be used that include: Sodium Sulfate, Ascorbic Acid, Lactic Acid, Malic Acid, Sodium Ascorbate, and Tartaric Acid.

In an important embodiment, a white base color (such as $TiO_2$ and/or calcium carbonate) is added to the base to achieve a full spectrum of vibrant colors. The white base is what allows any added color to visually 'pop' or reflect different hues. $TiO_2$ is one compound that works well in a white base color.

For an instant ready to mix food paint, the mixture amounts are preferably combined together into one dry compound.

In one preferred embodiment, the mixture is combination per table 1 below (gr=gram). The min/max percentages are based on weight.

The mixture amounts may be scaled to different batch sizes by keeping the relative ratios of the ingredients the same. The weights are converted to percentages as shown in table 1, so as to facilitate mixing to the desired amount in different batch sizes. The ingredient amounts and weight percentages should be understood as rounded to the lowest significant digit.

$TiO_2$ is currently allowable at a 1% in a finished recipe per FDA (i.e. approximately 9 grams). If future regulations allow for a higher level of $TiO_2$, then the recipe coloring is improved by an increase in the amount.

The overall goal of the dry mixture is to provide an instant 'ready to mix with water' (or other edible liquid), decorative, and apply-able food paint mixture. The dry mixture will provide a vibrant color, lack of bleeding between different color mixtures, along with desirable taste.

The decorative mixture provides latitude for artists to mix their own art medium to their own specifications. For example, the thickness of the applied edible food paint can be varied. This is useful when the artist uses a pallet knife for decorating and creates a thicker mixture. It is also useful in diluting the mixture in water (or other liquid) allowing for a spritzer/airbrush to be used. The decorative mixture is very versatile, allowing 1-99% water/liquid content in the decorative mixture. Because it is a dry instant ready to mix formula, it also allows the artist to use as little or as much as they prefer for their projects.

Decorative items that are targeted in the conceived invention include food items such as cookies, cakes, confections, chocolates, and pastries. The flavoring type can be modified to match the item being decorated. Vanilla flavoring is one embodiment of the invention.

The decorating mixture may be applied with tools such as brushes, a rigid applicator, pallet knives, a sprayer, various stamps, sponges, roller type decorating and embossing, a squeeze tube, and other methods such as may be needed to create a desired aesthetic effect.

While various embodiments of the present invention have been described, the invention may be modified and adapted to various operational methods by those skilled in the art. Therefore, this invention is not limited to the description and FIGURE shown herein, and includes all such embodiments, changes, and modifications that are encompassed by the scope of the claims.

I claim:
1. A ready to mix decorative compound for food surfaces comprising:
A) a base application mixture comprising the following items:

TABLE 1

Recipe Amounts and Weight Percentages - Dry Mix Unit

| Item | Mix Range | Unit | Min Amt | Max Amt | Pct Min | Pct Max |
|---|---|---|---|---|---|---|
| Sugar - Granulated or Powder (Base) | 150-480 | gr | 150 | 480 | 9% | 61% |
| Flavoring such as Vanilla (Base) | 1-30 | gr | 1 | 30 | 0.1% | 6.2% |
| Salt (Base) | 0-20 | gr | 0 | 20 | 0.0% | 4.2% |
| Calcium Carbonate (Colorant) | 300-640 | gr | 300 | 640 | 18% | 81% |
| Titanium Dioxide $TiO_2$ (Colorant) | 0-300 | gr | 0 | 300 | 0.0% | 40% |
| FD&C or Lake Food Dye (Colorant) | 0-506 | gr | 0 | 506 | 0% | 53% |
| Cellulose Gum (Emulsifier) | 0.25-4 | gr | 0.25 | 4 | 0.01% | 0.9% |
| Citric Acid (pH Control) | 0.25-2 | gr | 0.25 | 2 | 0.01% | 0.4% |
| Total grams | | | 452 | 1982 | | |

1) a white colorant,
2) sugar,
3) sodium chloride, and
4) flavoring,
B) a colorant comprising at least one of the following items:
1) approved FD&C food colorants,
2) aluminum lake pigments,
3) mixtures of food colorants,
C) an emulsifier comprising a vegetable gum,
D) a pH additive comprising citric acid,
E) wherein said white colorant comprises:
1) calcium carbonate in an amount from about 21% to about 80% by weight of the decorative compound, and
2) titanium dioxide in an amount from about 0.1% to about 37% by weight of the decorative compound, and
F) wherein said base application mixture, said colorant, said emulsifier, and said pH additive are premixed together to create said decorative compound, and
G) wherein said decorative compound is free of pearlescent pigments.

2. A decorative mixture for food surfaces comprising:
A) from about 9% by weight to about 57% by weight sugar,
B) from about 0.1% by weight to about 5.6% by weight flavoring,
C) from about 0.2% by weight to about 3.8% by weight salt,
D) from about 21% by weight to about 80% by weight calcium carbonate,
E) from about 0.1% by weight to about 37% by weight titanium dioxide,
F) from about 0.1% by weight to about 50% by weight food dye,
G) from about 0.01% by weight to about 0.8% by weight cellulose gum,
H) from about 0.01% by weight to about 0.4% by weight, citric acid, and
I) wherein said decorative mixture is free of pearlescent pigments.

* * * * *